United States Patent
Żrodowski et al.

(10) Patent No.: US 11,148,205 B2
(45) Date of Patent: Oct. 19, 2021

(54) METHOD FOR ADDITIVE MANUFACTURING OF THREE-DIMENSIONAL OBJECTS FROM METALLIC GLASSES

(71) Applicant: HERAEUS ADDITIVE MANUFACTURING GMBH, Hanau (DE)

(72) Inventors: Łukasz Żrodowski, Gdańsk (PL); Krzysztof Jan Kurzydłowski, Warsaw (PL); Wojciech Święszkowski, Warsaw (PL); Bartlomiej Wysocki, Warsaw (PL)

(73) Assignee: HERAEUS ADDITIVE MANUFACTURING GMBH, Hanau (DE)

( * ) Notice: Subject to any disclaimer, the term of this patent is extended or adjusted under 35 U.S.C. 154(b) by 516 days.

(21) Appl. No.: 16/069,120

(22) PCT Filed: Jan. 13, 2017

(86) PCT No.: PCT/PL2017/000002
§ 371 (c)(1),
(2) Date: Jul. 10, 2018

(87) PCT Pub. No.: WO2017/123107
PCT Pub. Date: Jul. 20, 2017

(65) Prior Publication Data
US 2019/0001440 A1    Jan. 3, 2019

(30) Foreign Application Priority Data
Jan. 15, 2016    (PL) .......................... 415814

(51) Int. Cl.
| | | |
|---|---|---|
| B22F 10/20 | (2021.01) | |
| B33Y 70/00 | (2020.01) | |
| B33Y 10/00 | (2015.01) | |
| B22F 10/36 | (2021.01) | |
| B23K 26/082 | (2014.01) | |
| B23K 26/342 | (2014.01) | |
| B23K 103/16 | (2006.01) | |
| B23K 26/00 | (2014.01) | |
| B23K 26/06 | (2014.01) | |
| C22C 45/00 | (2006.01) | |
| C22C 45/08 | (2006.01) | |
| C22C 45/10 | (2006.01) | |

(52) U.S. Cl.
CPC .............. B22F 10/20 (2021.01); B22F 10/36 (2021.01); B33Y 10/00 (2014.12); B33Y 70/00 (2014.12); *B22F 2999/00* (2013.01); *B23K 26/0006* (2013.01); *B23K 26/0626* (2013.01); *B23K 26/082* (2015.10); *B23K 26/342* (2015.10); *B23K 2103/16* (2018.08); *C22C 45/008* (2013.01); *C22C 45/08* (2013.01); *C22C 45/10* (2013.01); *C22C 2200/02* (2013.01); *C22C 2202/02* (2013.01); *Y02P 10/25* (2015.11)

(58) Field of Classification Search
None
See application file for complete search history.

(56) References Cited

FOREIGN PATENT DOCUMENTS

| | | | | |
|---|---|---|---|---|
| CN | 104480462 A | * | 4/2015 | |
| CN | 104480462 A | | 4/2015 | |
| EP | 1419836 A1 | | 5/2004 | |
| EP | 1583625 B1 | | 7/2004 | |
| EP | 2081714 B1 | | 4/2008 | |
| EP | 2326443 | | 6/2011 | |
| JP | 5760222 B2 | * | 8/2015 | ........... B32B 15/011 |
| WO | 2010/027317 | | 3/2010 | |

OTHER PUBLICATIONS

Ye, Xiaoyang, and Yung C. Shin. "Synthesis and characterization of Fe-based amorphous composite by laser direct deposition." Surface and Coatings Technology 239 (2014): 34-40. (Year: 2014).*
Espacenet Machine translation of JP-5760222-B2 retrieved on Nov. 6, 2020 (Year: 2015).*
Espacenet Machine translation of CN-104480462-A retrieved on Nov. 6, 2020 (Year: 2015).*
Partial English translation of office action dated Apr. 10, 2020 received for counterpart Chinese patent application No. 201780006081.8.
International Search Report and Written Opinion dated Jul. 3, 2017 by the European Patent Office in its capacity as International Searching Authority for counterpart international patent application No. PCT/PL2017/000002.
Jung, Hyo Yun et al., "Fabrication of Fe-based bulk metallic glass by selective laser melting: A parameter study" Materials and Design 86, pp. 703-708 (2015).

(Continued)

*Primary Examiner* — Keith D. Hendricks
*Assistant Examiner* — Joshua S Carpenter
(74) *Attorney, Agent, or Firm* — Stradley Ronon Stevens & Young, LLP

(57) ABSTRACT

A method for additive manufacturing of three-dimensional objects from metallic glasses utilizing a process of melting of successive layers of the starting material by a laser beam or an electron beam. The method includes steps such that every material layer is melted twice, using parameters which yield a crystalline melt trace in the first melting, and the successively melted beam paths contact with one another, while in the second melting, parameters yielding an amorphous melt trace are used, and the successively remelted paths or spots do not come in contact with one another, and/or between the scanning of successive paths or spots, an interval not shorter than 10 ms is maintained, the surface power density in the first remelting being lower than in the second remelting.

20 Claims, No Drawings

(56) References Cited

OTHER PUBLICATIONS

Kawahito, Yousuke et al., "High-power fiber laser welding and its application to metallic glass Zr55Al10Ni5Cu30" Materials Science and Engineering B 148, pp. 105-109 (2008).

Li, Ruifeng et al, "Effect of the remelting scanning speed on the amorphous forming ability of Ni-based alloy using laser cladding plus a laser remelting process", Surface and Coastings, vol. 259, pp. 725-731 (2014) doi:10.1016/J.SURFCOAT.2014.09.067, ISSN 0257-8972, XP029096675 [A] 1-12.

Pauly, Simon et al., "Processing metallic glasses by selective laser melting" Materials Today, vol. 16, Nos. 1/2 pp. 37-41, Jan./Feb. 2013.

Ye, Xiaoyang et al, "Synthesis and characterization of Fe-based amorphous composite by laser direct deposition", Surface and Coatings Technology vol. 239, pp. 34-40 (2014), doi:10.1016/J.SURFCOAT.2013.11.013, ISSN 0257-8972, XP028668889 [A] 1-12.

Zak A., and Burian, W., "Stanowisko badawcze do odlewania masywnych stopow amorficznych" (Experimental Unit for Casting of Bulk Amorphous Alloys), Prace IMZ 4, pp. 35-39 (2010).

Zheng, B. et al., "Processing and behavior of Fe-based metallic glass components via laser-engineered net shaping" Metallurgical and Materials Transactions A, vol. 40A, pp. 1235-1245 (May 2009).

* cited by examiner

METHOD FOR ADDITIVE MANUFACTURING OF THREE-DIMENSIONAL OBJECTS FROM METALLIC GLASSES

RELATED APPLICATIONS

This application is a U.S. national phase application of International Patent Application No. PCT/PL2017/000002 filed on Jan. 13, 2017 and published as international Publication No. WO 2017/123107 on Jul. 20, 2017. This application claims the benefit of priority to Patent Application No. P.415814 filed in Poland on Jan. 15, 2016, the contents of which are incorporated in this application by reference.

TECHNICAL FIELD

The invention relates to a method for additive manufacturing of three-dimensional objects from metallic glasses.

BACKGROUND OF THE INVENTION

A metallic glass is a material made up of a binary or polynary amorphous alloy, wherein a metal is a basic component. Metallic glasses are metastable, they are in a thermodynamically unstable state, and their state of equilibrium is a crystalline state. A transition to the state of equilibrium, called glass crystallization, occurs at a so-called devitrification temperature (crystallization temperature), having a value depending on the composition of the alloy and heating rate.

Metallic glasses are characterized by a series of properties which do not occur among their crystalline equivalents. They are characterized by a high hardness, strength, elasticity, resistance to pitting and electrical resistance. Metallic glasses containing 75-80% of atoms of a transition metal (mainly iron or cobalt) and 25-20% of non-metal atoms (silicon, boron, carbon, phosphorus) or non-magnetic metals (aluminum) are magnetically soft materials. Very low coercivity and magnetostriction give rise to common application of wholly or partially glassy alloys for transformer cores, particularly in the United States and Asia. Easy formation in the super-cooled liquid range enables manufacturing of micromechanisms from them, and the high strength and resistance to corrosion make them an attractive construction material or biomaterial.

The majority of metallic glasses is obtained in the form of thin strips or wires by a melt spinning method, or in the form of atomized powder. Full use of their potential as construction materials requires them to be obtained in a bulk form. Bulk amorphous alloys are characterized by very good mechanical, physical and chemical properties which cannot be utilized in amorphous materials having the form of strips or achieved in crystalline materials. However, the obtaining of such alloys is associated with several problems. The first one is the high cost of rare alloying elements necessary to obtain products having a thickness above 1 mm. Application of techniques ensuring high cooling rates is also essential. When the cooling rate is lower than a critical value, crystallization in the alloys begins, and then the obtained material does not have the appropriate structure, and thereby properties. Various types of alloys have different critical cooling rates, necessitating the selection of a suitable manufacturing technique, which allows for ensuring an amorphous structure. Moreover, there exists an obstacle linked to the production of amorphous alloys in the form of objects with large cross-sections, resulting from the rate of heat dissipation from the interior of the setting alloy, which may be low, leading to the formation of crystalline structure inside the bulk alloy, while the alloy has an amorphous structure on its surface due to faster heat dissipation from the surface of the setting alloy [A. Zak, W. Burian, "Stanowisko badawcze do adlewania masyw nych stopow amorficznych" (Experimental Unit for Casting of Bulk Amorphous Alloys), Prace IMZ 4 (2010)].

The first known method of production of bulk metallic glass objects is based on the optimization of the starting material composition in order to lower the critical cooling rate required for its amorphization.

According to this concept, a series of compositions was developed, initially based on noble metals, then on transition metals and lanthanides and light metals. The best of these alloys do not crystallize even at cooling rates of the order of several K/s, which has allowed for obtaining objects with a thickness up to 70 mm for a platinum-based alloy, 30 mm for a zirconium-based alloy and 10 mm for iron-based alloys. This method is best suited to manufacturing small and lightweight elements in large batches by injection, or superplastic molding; however, the high costs of the method and the injection apparatus result in the fact that it is uneconomical for small batches and unit production.

A second concept consists in the "bulking" of amorphous strips or the powder obtained earlier. To this end, methods of pressure welding, compression molding, pad welding, spraying, explosive joining, and SPD (severe plastic deformation) are used; the methods of pressure sintering, particularly SPS (spark plasma sintering) being most common. Depending on the selected method, joining of the initial raw glass material occurs on the basis of simple diffusion (below the $T_g$), sintering with super-cooled liquid (between the $T_g$ and $T_x$). In every case, obtaining a bulk glassy object does not depend directly on the glassing ability of the alloy, but on its stability at the temperature of densification. This eliminates the basic manufacturing limitation constituted by the critical diameter. A considerable disadvantage of these methods is the difficulty in manufacturing large and geometrically complex objects and structural relaxation.

Currently, additive methods for preparation of novel materials are intensely developed, wherein the initial material is being joined in a series of repeating steps in order to form it into the final shape. For instance, selective laser melting is a method based on the concept of joining consecutive powder layers with the use of a laser beam.

The process is executed by spreading a thin powder layer and scanning its surface with a laser beam according to the data entered earlier, pertaining to the consecutive layers of the cross section of the object being manufactured. Selecting the proper working parameters of the laser beam allows for the melting or sintering of the powder layer in precisely defined cross sections. This operation is repeated for subsequent powder layers. The duration of the laser beam influence on the material is of the order of microseconds—during this time, the powder is melted, mixed with the substrate material and then it cools down. As a consequence, the obtained heating and cooling rates are sufficient for achieving and maintaining an amorphous structure in the case of many alloys. For the first time, this approach was disclosed in Patent Application No. EP 2081714, where a process for remelting of powders of metallic glasses was presented, then in EP 2326443, where an additional process carried out for nanocrystallization is described. Other attempts to use an additive process for obtaining materials are described in the paper by Pauly, Simon et al., *Processing metallic glasses by selective laser melting*, Materials Today 16.1 (2013):37-41, where application of this technique in a powder bed is presented, and in the paper by Zheng, B. et al., *Processing and behavior of Fe-based metallic glass components via laser-engineered net shaping*, Metallurgical and Materials Transactions A 40.5 (2009): 1235-1245, where a laser cladding technique is described.

If the initial material has a low glass-forming ability, then in additive methods, such as melting of a powder or a wire by a laser electron beam or an electric arc, obtaining an object which is both amorphous and without pores is impossible. This phenomenon is observed because the increase in density is determined by increasing the amount of energy supplied to the raw material, similarly as in the paper by Jung, Hyo Yun et al., *Fabrication of Fe-based bulk metallic glass by selective laser melting: a parameter study*, Materials & Design 86 (2015): 703-708. However, increasing the total supplied energy may cause a decrease in the amorphous phase content in the heat affected zone, as described in the paper by Kawahito, Yousuke et al., *High-power fiber laser welding and its application to metallic glass Zr 55 Al 10 Ni 5 Cu 30*, Materials Science and Engineering: B148.1 (2008): 105-109.

Considering the above, only alloys with a high glass-forming ability, attained due to the presence of numerous and expensive alloy additions, are used in additive manufacturing methods. Meanwhile, there are some alloys with a low glass-forming ability but very interesting properties. For example, aluminum alloys are characterized by their very high strength, iron-based alloys with minimal alloying additions content have very high magnetic saturation and tungsten-based alloys are a promising amorphous material for operation at elevated temperatures. Therefore, the use of such alloys in additive manufacturing methods would be highly desirable.

In each case, amorphization of the alloy requires high cooling rates, which—in combination with the low crack resistance of the glasses and multiple thermal shocks—leads to extensive cracking in the amorphous object. This constitutes yet another difficulty in the manufacturing of amorphous objects of large dimensions.

SUMMARY OF THE INVENTION

The present invention solves the problems defined above.

The method for additive manufacturing of three-dimensional objects from metallic glasses using a process of melting of successive layers of the starting material by a laser beam or an electron beam according to the invention is characterized in that every material layer is melted twice using parameters which yield a crystalline melt trace during the first melting, and the successively melted beam paths come in contact with one another, while in the second melting, parameters yielding an amorphous melt trace are used, and the successively remelted paths or spots do not come in contact with one another, and/or between the scanning of successive paths or spots an interval not shorter than 10 ms is maintained. During the first melting, the surface power density of the beam focused on the powder surface is lower than in the remelting process.

Preferably, the paths and/or spots during the amorphous remelting are separated by a distance not shorter than 300 µm.

Preferably, the first melting is realized with a beam speed of 10-2000 mm/s and a surface power density of $10^4$-$5 \cdot 10^5$ W/cm$^2$, and the remelting—with a beam speed of 200-5000 mm/s and a surface power density above $5 \cdot 10^5$ W/cm$^2$. The remelting may be realized in pulses with a surface power density above $5 \cdot 10^5$ W/cm$^2$. The remelting parameters depend on the composition of the alloy being processed; however, a condition of different parameters for melting and remelting is always met.

In a preferable option of the invention, a layer of the material constituting a cross-section of the manufactured object and a layer of the material surrounding it are melted in the first melting, while in the remelting, parameters yielding an amorphous melt trace are used for the object's cross-section, and for the remaining part of the layer, parameters yielding a crystalline melt trace are used or this part of the layer is omitted. It is also possible to use different melting parameters for the cross-section of the manufactured object and for the remaining part of the layer in the first remelting. For the part of the material which is not a cross-section of the manufactured object, multiple crystalline meltings of each layer may also be used. In this option of the method according to the invention, an amorphous object surrounded by a crystalline allowance is obtained. In the case of alloys with a high susceptibility to cracking, this facilitates the preservation of the structural integrity of the manufactured object.

For the first crystalline melting, the beam power is selected based on the melting temperature, melting enthalpy and thermal conductivity of the processed alloy, and the beam speed is selected basing on the wettability of the melted alloy in relation to the previous layer. For the remelting, the heating rate is selected in such a way that the temperature of maximum crystallization rate ($T_p$) is higher than the melting temperature. For the remelting, the power is selected so as to exceed the power density needed for evaporation of the material and formation of a key-hole mode melt. This allows for obtaining an amorphous remelt deeper than one layer. The aforementioned rules of parameter selection are known to those skilled in the art, who will determine the proper parameters for the amorphous and crystalline remelting of a selected alloy.

Preferably, the initial material has the form of a powder, metal sheet, metal strip or wire.

Preferably, alloys containing metals such as iron, tungsten, zinc, nickel, titanium, magnesium, aluminum, yttrium or calcium are used as the initial material, with the smallest possible content of alloy additions, preferably binary or ternary alloys, in which the remaining components are metalloids such as, for instance, silicon, boron, or non-metals such as, for instance, carbon or phosphorus. Preferably, the following alloys are used: Fe—Si, W—Si, Fe—Si—B, Al—Ni—Si, Mg—Zn—Ca, W—Si—B. The above materials are indicated as examples only, since the method according to the invention finds application in manufacturing of dense amorphous objects from any alloy.

The amorphous object may then be subjected to isostatic pressing. In the case of obtaining an amorphous object with a crystalline allowance, the latter is removed after densification. Isostatic pressing is used in cases when the obtained object has a porosity exceeding 2% or microcracks are found. In cases when the manufactured object contains internal ducts or cavities, it is preferable to remelt their interior with parameters yielding a crystalline melt trace. This prevents them from collapsing during subsequent heat treatment.

DETAILED DESCRIPTION OF EMBODIMENTS OF THE INVENTION

The method according to the invention envisions two remeltings for each layer. The aim of the first remelting is the densification of the material and a reduction in its porosity, and the aim of the second remelting consists in amorphization of the previously melted material on the cross-section of the manufactured object. Formation of a crystalline structure of the layer as a result of the first melting allows for the elimination of problems connected with obtaining an amorphous structure for numerous starting materials. In order to obtain an amorphous structure, a high beam speed is usually necessary, though increasing the speed leads to defect formation, resulting from incomplete powder melting. The beam power cannot be significantly increased either, as during the key-hole mode melting there occurs an explosive removal of the powder from the processing area. According to the invention, the first crystalline melting eliminates the above limitations, as the entire layer has been previously bonded. As a result, it is possible to execute a deep amorphous remelting of the same layer in the second stage. With a heating rate higher than the critical value, crystallization in the heat-affected zone of the remelting does not occur. This allows for maintaining the continuity of the glassy phase between the layers. Maintaining the distance between the beam paths or spots, or maintaining the time interval during the amorphous remelting limits the influence of the subsequently remelted path on the solidification of the previous one, and as a result, the heat accumulation is limited, which allows for maintaining a high glassy phase content.

As a result of the method according to the invention, an object in the amorphous form is obtained, possibly surrounded by a crystalline allowance. In the case of manufacturing objects with a complex geometry by additive methods, stress induced in an amorphous object during its production causes the propagation of microcracks and delamination of an object during the manufacturing process. A crystalline allowance around an amorphous object prevents macroscopic cracking, due to the fact that the crystalline phase typically has a higher resistance to cracking than the amorphous phase. The crystalline allowance is removed mechanically or etched chemically, and its porous or scaffold-like form allows for easier removal by penetration with an etching agent. Moreover, in the case of an object with a complex geometry, it is important that the allowance may be removed from all runner extensions or cavities, which would be difficult with a completely solid allowance.

Application of advanced scanning strategies in known in the art, for example from EP1583625, where a double scanning strategy is used for preliminary heating of a powder, and from EP1419836, where a double scanning strategy is used for reduction of residual stress. Both of these strategies are not suitable for metallic glasses with a low glass-forming ability due to intense crystallization. The strategy applied in EP1583625, used in electron beam melting, causes an increase in the sample temperature, which limits the cooling and heating rates, while the strategy applied in EP1419836 uses parallel paths with double melting, which precludes the vitrification of alloys with a low glass-forming ability. The solution according to the invention also differs from EP2326443 by the scanning order and the applied strategy. In EP2326443 a solution of double scanning for alloys with a high glass-forming ability for subsequent nanocrystalliiation is proposed. However, this solution is unsuitable for an alloy which crystallizes during the first scanning. In the solution according to the invention, the material is first bonded and crystallizes, and only in the second step do densification and amorphization occur due to the separation of the paths and/or spots and remelting with a higher energy density. A change in surface power density in the second scanning ensures a deeper remelting and fusion of the layers.

Using the method according to the invention, a metallic object containing more than 50% of the amorphous phase and having a relative density higher than 80% is obtained, which may be then subjected to densification by isostatic pressing.

Examples

The method according to the invention is presented in more detail in the examples. The following examples are included to more clearly demonstrate the overall nature of the invention. These examples are exemplary, not restrictive, of the invention.

Example 1

An amorphous powder having the following nominal composition: Cu: 40%, Zr: 58%, and Al: 2% by weight was melted selectively on a Realizer SLM-50 apparatus equipped with a 100 W Nd:YAG laser. The layer thickness was 50 μm. Every layer was melted twice, at first with a beam speed of 200 mm/s and a surface power density of $8 \cdot 10^4$ W/cm$^2$, where the laser paths were 50 μm wide and realized successively, then the layer was remelted with a surface power density of $10^6$ W/cm$^2$ and a beam speed of 2000 mm/s; the laser paths were 50 μm wide, and the successive paths were separated by a distance of 1 mm.

Example 2

An amorphous powder having the following nominal composition: Mg: 43%, Zn: 53%, and Ca: 4% by weight was remelted selectively on an SLM 280HL apparatus (SLM Solutions) equipped with a 400 W Nd:YAG laser. The layer thickness was 100 μm. Every layer of the amorphous core was melted twice, at first with a beam speed of 100 mm/s and a surface power density of $10^4$ W/cm$^2$, where the laser paths were 200 μm wide and realized successively, then the layer was melted with a surface power density of $5 \cdot 10^5$ W/cm$^2$ and a beam speed of 5000 mm/s, the laser paths were 100 μm wide, and the successive paths were separated by a distance of 1 mm.

Example 3

An amorphous powder having the following nominal composition: Fe: 87.160%, Cr: 2.4%, Si: 6.41%, B: 2.51%, and C: 1.60% by weight and a particle size below 53 μm was melted selectively on a Realizer SLM-50 apparatus equipped with a 100 W Nd:YAG laser. The layer thickness was 50 μm. Every layer of the crystalline allowance was melted once with a beam speed of 100 mm/s and a surface power density of $1.8 \cdot 10^5$ W/cm$^2$, where the laser paths were 100 μm wide and realized successively. The thickness of the crystalline allowance was 2 mm. Every layer of the amorphous core was remelted twice, at first with a beam speed of 100 mm/s and a surface power density of $1.8 \cdot 10^5$ W/cm$^2$, where the laser paths were 100 μm wide and realized successively, then the layer was remelted with a surface power density of $10^6$ W/cm$^2$, where the laser operated in a pulse mode with a pulse duration of 20 μs. The amorphous core was covered with a square grid having a periodicity of 40 μm, with nodes containing spots irradiated in such a way that two successive remelted spots were separated by a distance not lower than 1 mm. Next, the samples cut off from the build plate were densified by the isostatic pressing method. The crystalline allowance was then removed mechanically, and the object was cleaned in an acid.

Example 4

A powder having the following nominal composition: Al: 70%, Si: 12%, and Ni: 18% by weight and a particle size below 53 µm was obtained by the milling of tapes. It was then melted selectively on an SLM-50 apparatus (Realizer) equipped with a 100 W Nd:YAG laser. The layer thickness was 40 µm. The objects had a form of a torus supported on a scaffold-like crystalline allowance. Every layer of the crystalline allowance was melted one time with a beam speed of 250 mm/s and a surface power density of $2 \cdot 10^5$ W/cm$^2$, where the laser paths were 65 µm wide and realized successively. Every layer of the amorphous core was remelted at first with a beam speed of 250 mm/s and a surface power density of $2 \cdot 10^5$ W/cm$^2$, where the laser paths were 65 µm wide and realized successively with a speed of 2000 mm/s, then with a surface power density of $6 \cdot 10^5$ W/cm$^2$, where the laser paths were 100 µm wide, and the two paths being remelted successively were separated by a distance of 300 µm. The allowance was removed mechanically.

Example 5

A mixture of tungsten, silicon and boron pure powders with a mass ratio of 8:1:1 was melted selectively on an SLM 280HL apparatus (SLM Solutions) equipped with a 400 W Nd:YAG laser. The layer thickness was 80 µm. The objects had a form of a cylinder prepared directly on a base plate, surrounded with an allowance having a thickness of 500 µm. Every layer of the crystalline allowance was remelted one time with a beam speed of 500 mm/s and a surface power density of $8 \cdot 10^5$ W/cm$^2$, where the laser paths were 50 µm wide and realized successively. Every layer of the amorphous core was melted at first with a beam speed of 500 mm/s and a surface power density of $8 \cdot 10^5$ W/cm$^2$; the laser paths were 70 µm wide and realized successively. The layer of the amorphous core was then remelted with a beam speed of 2000 mm/s and a surface power density of $2 \cdot 10^6$ W/cm$^2$, where the laser paths were 100 µm wide, and an interval of 50 ms was used between the successive remelted paths. The allowance was removed by etching.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. It is also expressly intended that the steps of the methods disclosed above are not restricted to any particular order.

The invention claimed is:

1. A method for additive manufacturing of three-dimensional objects from metallic glasses, the method comprising:
melting successive layers of an alloying starting material by a laser beam or an electron beam which defines successively melted beam paths or spots in every material layer, wherein every material layer is melted twice, wherein said melting of successive layers comprises the steps of:
performing a first melting wherein the laser beam or electron beam yields a crystalline melt trace, and during which the successively melted beam paths or spots come in contact with one another;
performing a remelting wherein the laser beam or electron beam yields an amorphous melt trace and wherein the successively remelted paths or spots do not come in contact with one another and/or an interval not shorter than 10 ms is maintained between the scanning of the successively remelted paths or spots, and wherein the surface power density in the first melting is lower than in the remelting.

2. The method according to claim 1, wherein in the amorphous remelting, paths or spots remelted successively are separated by a distance not shorter than 300 µm.

3. The method according to claim 1, wherein the first melting is realized with a beam speed of 10-2000 mm/s and a surface power density of $10^4$-$5 \cdot 10^5$ W/cm$^2$.

4. The method according to claim 1, wherein the remelting is realized with a beam speed of 200-5000 mm/s and a surface power density above $5 \cdot 10^5$ W/cm$^2$.

5. The method according to claim 1, wherein the remelting is realized in pulses with a surface power density above $5 \cdot 10^5$ W/cm$^2$.

6. The method according to claim 1, wherein the first melting comprises melting a layer of the material constituting a cross-section of the manufactured object and a layer of the material surrounding it,
and wherein the remelting comprises melting with the laser beam or electron beam to yield an amorphous melt trace within the object's cross-section, wherein for the remaining part of the material which is not a cross-section of the manufactured object, either no melting is performed or melting with the laser beam or electron beam yields a crystalline melt trace.

7. The method according to claim 6, wherein the first melting further comprises using different operational melting parameters of the laser beam or electron beam for the cross-section of the manufactured object and for the remaining layer of the material surrounding it.

8. The method according to claim 6, further comprising melting multiple times with the laser beam or electron beam to yield a crystalline melt trace within the layer of the material which is not a cross-section of the manufactured object.

9. The method according to claim 1, wherein the alloying starting material is in a form of a powder, sheet, strip or wire.

10. The method according to claim 1, wherein binary or ternary alloys containing at least one metal and at least one metalloid and/or non-metal are used as the alloying starting material.

11. The method according to claim 10, wherein the at least one metal is iron, tungsten, zinc, nickel, titanium, magnesium, aluminum, yttrium, or calcium.

12. The method according to claim 10, wherein the metalloid and/or non-metal are selected from: silicon, boron, carbon, or phosphorus.

13. A method for additive manufacturing of three-dimensional objects from metallic glasses, the method comprising:
providing an alloying starting material in a form of a powder, sheet, strip or wire including binary or ternary alloys containing at least one metal and at least one metalloid and/or non-metal; and
melting successive layers of the alloying starting material by a laser beam or an electron beam which defines successively melted beam paths or spots in every material layer, wherein every material layer is melted twice, performing a first melting wherein the laser beam or electron beam has a beam speed of 10-2000 mm/s and a surface power density of $10^4$-$5 \cdot 10^5$ W/cm$^2$ which yields a crystalline melt trace in the first melting during which the successively melted beam paths or spots come in contact with one another;

performing a remelting wherein the laser beam or electron beam yields an amorphous melt trace and wherein the successively remelted paths or spots are separated by a distance not shorter than 300 μm and/or an interval not shorter than 10 ms is maintained between the scanning of the successively remelted paths or spots, and wherein the surface power density in the first melting is lower than in the remelting.

14. The method according to claim 13, wherein the remelting is realized with a beam speed of 200-5000 mm/s and a surface power density above $5 \cdot 10^5$ W/cm$^2$.

15. The method according to claim 13, wherein the remelting is realized in pulses with a surface power density above $5 \cdot 10^5$ W/cm$^2$.

16. The method according to claim 13, wherein the first melting comprises melting a layer of the material constituting a cross-section of the manufactured object and a layer of the material surrounding it, and wherein the remelting comprises melting with the laser beam or electron beam to yield an amorphous melt trace within the object's cross-section, wherein for the remaining part of the material which is not a cross-section of the manufactured object, either no melting is performed or melting with the laser beam or electron beam yields a crystalline melt trace.

17. The method according to claim 16, wherein the first melting further comprises using different operational melting parameters of the laser beam or electron beam for the cross-section of the manufactured object and for the remaining layer of the material surrounding it.

18. The method according to claim 16, further comprising melting multiple times with the laser beam or electron beam to yield a crystalline melt trace within the layer of the material which is not a cross-section of the manufactured object.

19. The method according to claim 13, wherein the at least one metal is iron, tungsten, zinc, nickel, titanium, magnesium, aluminum, yttrium, or calcium and the metalloid and/or non-metal are selected from silicon, boron, carbon, or phosphorus.

20. A method for additive manufacturing of three-dimensional objects from metallic glasses, the method comprising:

providing an alloying starting material in a form of a powder, sheet, strip or wire including binary or ternary alloys containing at least one metal and at least one metalloid and/or non-metal, wherein the at least one metal is iron, tungsten, zinc, nickel, titanium, magnesium, aluminum, yttrium, or calcium and the metalloid and/or non-metal are selected from silicon, boron, carbon, or phosphorus; and melting successive layers of the alloying starting material by a laser beam or an electron beam which defines successively melted beam paths or spots in every material layer, wherein every material layer is melted twice, performing a first melting wherein the laser beam or electron beam has a beam speed of 10-2000 mm/s and a surface power density of $10^4$-$5 \cdot 10^5$ W/cm$^2$ which yields a crystalline melt trace in the first melting, during which the successively melted beam paths or spots come in contact with one another;

performing a remelting wherein the laser beam or electron beam yields an amorphous melt trace and wherein the successively remelted paths or spots are separated by a distance not shorter than 300 μm and/or an interval not shorter than 10 ms is maintained between the scanning of the successively remelted paths or spots, and wherein the surface power density in the first melting is lower than in the remelting, wherein the first melting comprises melting a layer of the material constituting a cross-section of the manufactured object and a layer of the material surrounding it, and wherein the remelting comprises melting with the laser beam or electron beam to yield an amorphous melt trace within the object's cross-section, wherein for the remaining part of the material which is not a cross-section of the manufactured object, either no melting is performed or melting with the laser beam or electron beam yields a crystalline melt trace.

* * * * *